Oct. 25, 1949.  G. R. TREMOLADA  2,485,940
PACKING CARTRIDGE

Filed Sept. 19, 1945.  2 Sheets-Sheet 1

INVENTOR.
GUGLIELMO R. TREMOLADA
BY
ATTORNEY

Oct. 25, 1949.  G. R. TREMOLADA  2,485,940
PACKING CARTRIDGE
Filed Sept. 19, 1945  2 Sheets-Sheet 2
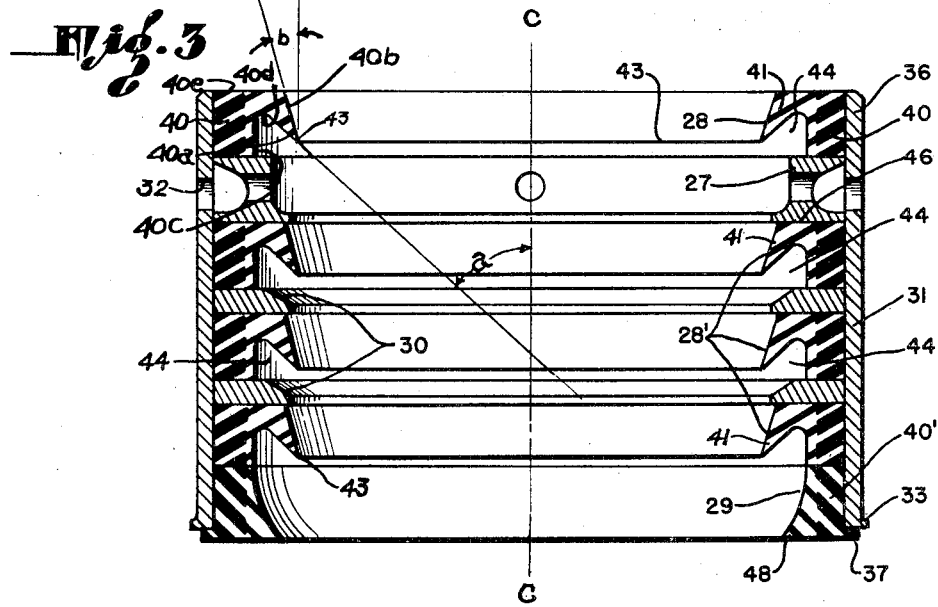
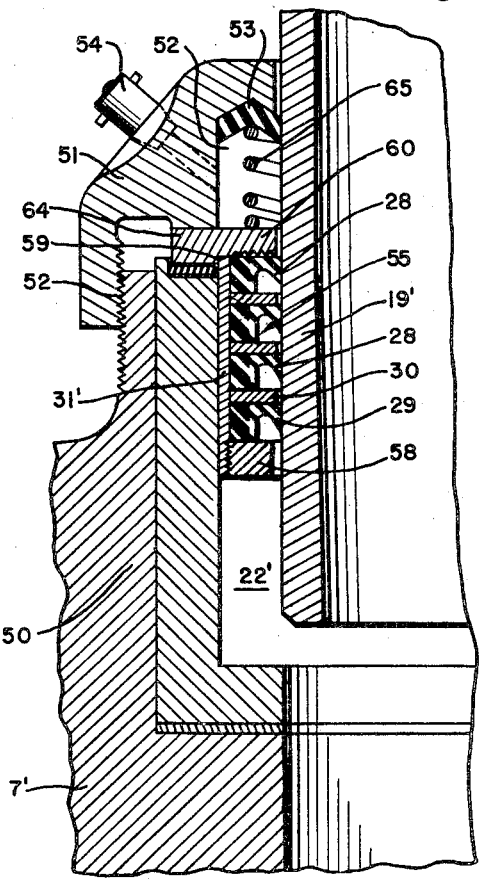
INVENTOR.
GUGLIELMO R. TREMOLADA
BY
ATTORNEY Patented Oct. 25, 1949

2,485,940

UNITED STATES PATENT OFFICE 2,485,940

PACKING CARTRIDGE

Guglielmo R. Tremolada, Los Angeles, Calif., assignor to Emsco Derrick & Equipment Company, Los Angeles, Calif., a corporation of California Application September 19, 1945, Serial No. 617,342

5 Claims. (Cl. 285—97.1)

My invention relates to a rotary swivel having an improved wash pipe packing arrangement.

In rotary swivels to which the present invention relates there is a shell which is suspended from the hoisting equipment of the derrick and a rotatable quill or body supported in said shell by bearings, the lower end of this body or quill being connected to the upper end of the drilling string. Drilling fluid, such as mud, is delivered into the upper end of the rotatable body through a swivel fluid connection consisting of a tube, ordinarily called the wash pipe, which extends into a packing gland, the wash pipe and the packing gland being in a rotatable relation. The packing which seals around the wash pipe ordinarily consists of specially designed rings, and when these rings wear so that they are no longer capable of performing their sealing function, it is necessary to replace the same. Ordinarily the replacement of the packing rings must be performed when the rotary swivel is in an elevated position in the derrick, this requiring that the workman who is to make the repair be hoisted up in the derrick by means of a rope. While working under these unsatisfactory conditions, it is necessary for him to disassemble the fluid swivel connection, take out the worn packing rings and replace the same with new rings. This packing replacement is difficult under the circumstances, and as a result thereof, the new packing rings are often improperly installed. For example, there is a grease lantern ring ordinarily employed in the packing assembly which must be properly placed with relation to the grease inlet fitting through which lubricant is periodically forced into the packing assembly. The new packing rings must be placed in proper number on opposite sides of the lantern ring and the means, such as a spring, for example, must be properly placed if the packing assembly is to give acceptable service. Instances are of record where the workman due to the conditions under which it is necessary for him to replace the packing, has improperly assembled the packing rings with relation to the lantern ring, or has placed the compression means on the wrong side of the packing assembly, with the result that early failure of the replacement packing has occurred.

Other instances have been noted where the workman not ordinarily a skilled mechanic having a good understanding of the operative relation of the fluid swivel parts, has placed the packings, or part of them, in the packing chamber in reverse or upside down position, It is an object of the invention to provide a rotary swivel having packing arrangement having therein packing rings characterized by extremely long life as compared to swivel packing ordinarily regarded as acceptable in the well drilling industry and wherein the cooperating parts of the fluid swivel connection are so formed that the packing means inherently must occupy its proper position, and wherein the packing rings cannot be inadvertently malpositioned either with respect to the direction in which the fluid pressure is applied or with respect to other parts of the packing assembly, such, for example, as the grease lantern.

It is a further object of the invention to provide a rotary swivel having a wall forming an annular packing chamber around the wash pipe and packing means in this chamber which includes a lantern ring spaced from the bottom of the chamber so as to receive grease from the grease inlet opening of the chamber, novel packing rings disposed in proper arrangement on opposite sides of the lantern ring and a cylindric sleeve disposed within the chamber and surrounding all of the rings so as to bond and hold them together in their proper operative relation. This sleeve cooperates with the rings to form a packing unit which is moved into and out of the packing chamber as a whole and avoiding the necessity for the workman to assemble packing rings with relation to each other or with relation to the lantern ring. When replacement of the packing is required, the unskilled workman merely removes the old packing unit and places a new packing unit, of the character described in the foregoing, in the chamber.

It is a further object of the invention to provide a swivel having the wall which forms the packing chamber so formed with relation to the packing unit, that the packing unit cannot be placed in the chamber in inverted position. This means that the workman who is making the packing replacement need exercise substantially no judgment, for the reason that he cannot place the packing in upsidedown position in the packing chamber.

It is a further object of the invention to provide a packing unit for the fluid swivel connection of a rotary swivel having the characteristics set forth in the foregoing, and a further object is to provide this packing unit with means for holding the rings together, such means being shorter than the assembly of rings so that the assembly of rings may be placed under compression when the unit is in the packing chamber of the rotary swivel.

Further objects and advantages of the invention will be brought out in the following part of the specification.

Referring to the drawings which are for illustrative purposes only,

Fig. 3 is an enlarged sectional view through the packing assembly, alone, taken on the plane indicated by the line 3—3 of Fig. 2.

Fig. 4 is a fragmentary sectional view showing an alternative form of the invention.

Fig. 5 is a fragmentary sectional view showing an alternative manner of preparing the packing unit so that it cannot be placed in the swivel in inverted position.

Figure 1:
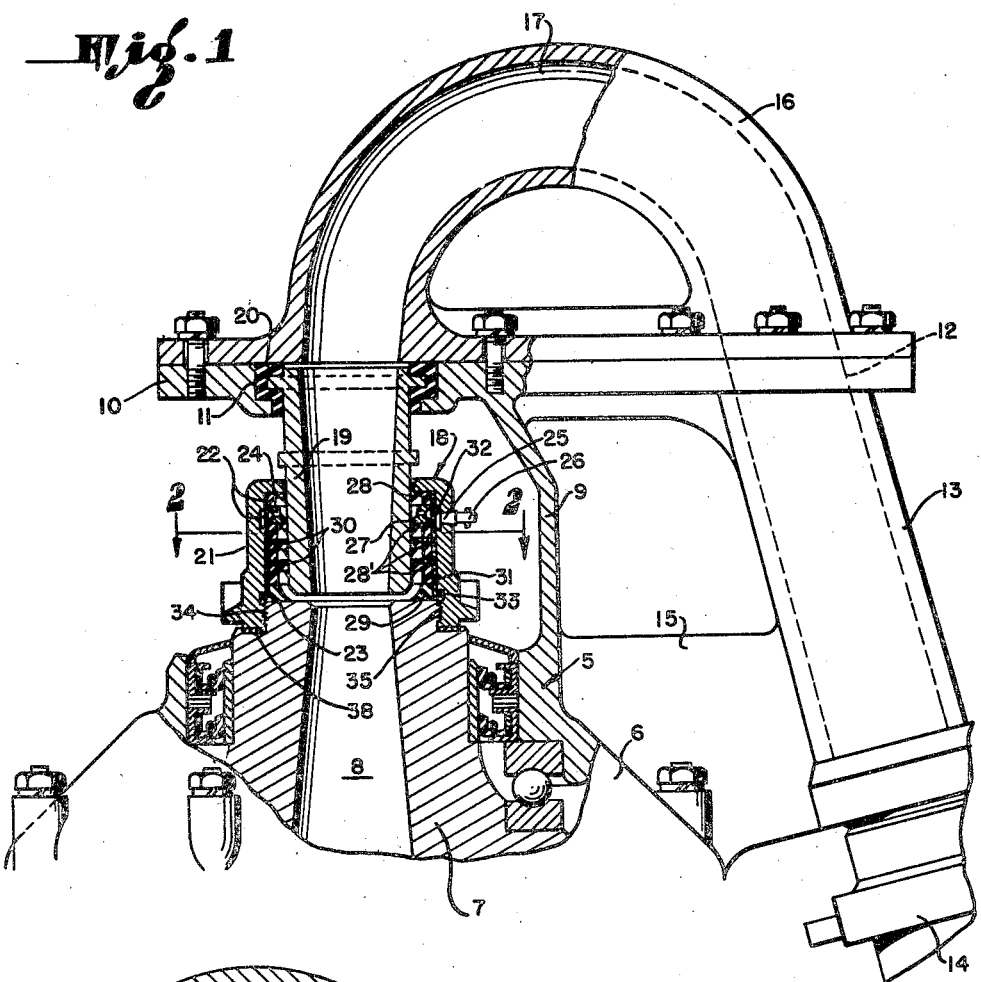
Fig. 1 is a partly sectioned view showing the upper part of a rotary swivel embodying a preferred form of my invention.
Figure 2:
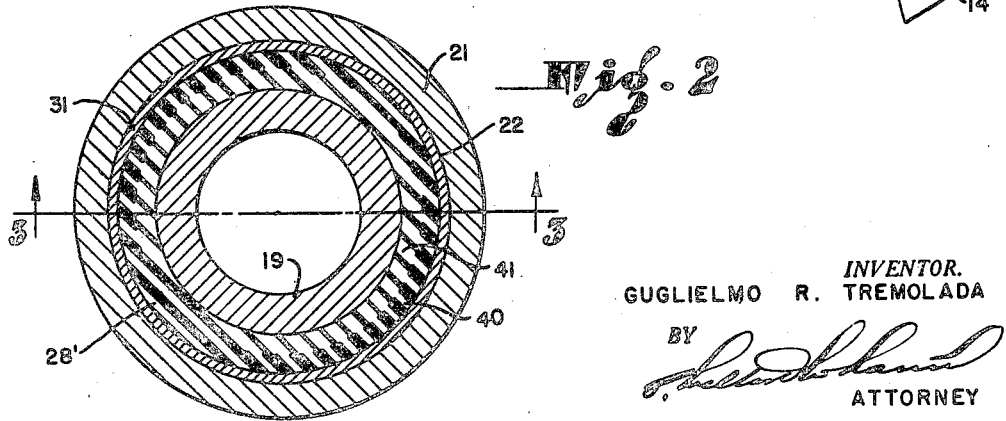
Fig. 2 is an enlarged cross sectional view taken as indicated by the line 2—2 of Fig. 1.

The rotary swivel 5 embracing my invention includes a shell part 6 and a quill or body part 7 which rotates within the shell 6 in a substantially vertical position and has an axial opening 8 through which rotary mud is conducted to the string of drill pipe, not shown. The shell part 6 has an extension 9 including a horizontal wall 10 having a counterbored opening 11 axially aligned with the rotatable body 7, and a second opening 12 forming the outlet mouth of a tubular wall 13 to which the rotary hose 14 is connected, the lower portion of the tubular wall 13 being connected to the main portion of the shell by a wall 15. A gooseneck member 16, bolted to the upper surface of the horizontal wall 10, has therein a curved passage 17 connecting the opening 12 with the counterbored opening 11.

A swivel fluid connection 18 connects the passage 17 of the member 16, which is supported upon the shell 6, with the passage 8 of the rotatable body part 7. This swivel fluid connection 18 includes a wash pipe 19 which extends downward from the horizontal wall 10 of the shell part 6 toward the body part 7. The wash pipe 19 has on its upper end an annular rubber body 20 which is clamped in the counterbored opening 11 of the wall 10. The rotatable part 7 has thereon a cylindric wall 21 defining an annular chamber 22 which surrounds the lower portion of the wash pipe 19, this chamber 22 having end walls 23 and 24 which may be referred to as the bottom and top walls of the chamber 22. In the wall 21 there is a grease inlet opening 25 into which grease may be fed by means of a fitting 26.

Within the chamber 22 there is a lantern ring 27 positioned on substantially the same level as the grease inlet opening 25 so that the lantern 27 will receive grease from the grease inlet opening 25 and distribute the same around the adjacent portion of the wash pipe 19. Outwardly of the lantern ring 27 there is a sealing ring 28, and between the lantern ring 27 and the bottom wall 23 of the chamber 21 there is a plurality of sealing rings 28' similar or identical in form to the sealing ring 28. Between the lowermost sealing ring 28' and the bottom wall 23 there is a sealing ring 29 of a form different from that of the rings 28 and 28'. Between the sealing rings 28' there are rigid supporting rings 30, and around all of the rings 27, 28, 28', 29 and 30 there is a thin walled metal sleeve 31 which serves as bonding means to hold the assembly of rings in the positions in which they are shown, so that the sleeve 31, with the rings therein, may be moved out of or into the chamber 22 as a unit. The sleeve 31 has therein openings 32 for connecting the grease inlet opening 25 with the grease lantern ring 27.

The packing assembly is shown to enlarged scale in Fig. 3. As clearly shown therein, the sleeve 31 has at the lower edge thereof a projection 33 providing a means for preventing the assembly from being placed in the chamber 22 in inverted position. From Fig. 1 it will be noted that the wall 21 which forms the chamber 22 is in the form of a cup and that this wall 21 is connected to the rotatable body 7 by means of a threaded counterbore 34 which receives the externally threaded portion 35 of the rotatable member 7, such upper end portion being externally threaded so that the wall 21 may be screwed thereon. The projection 33 extends radially from the outer face of the sleeve 31 and is of such size that it will extend into the counterbore 34 as shown in Fig. 1, but is too large to pass into the bore of the wall 21 which defines the chamber 22. Therefore, if the packing unit is to be placed within the chamber 22, the upper or small end 36 of the shell must be first inserted through the counterbore 34 into the chamber 22, and if a workman should attempt to move the packing unit into the chamber 22 with the lower end foremost, the projection 33 will permit entry of the sleeve 31 only into the counterbore 34 and not into the chamber 22, this indicating to the workman that the packing unit is inverted from its proper position.

A further feature of the invention resides in making the sleeve 31 slightly shorter than the assembly of rings which it holds, so that at least one of these rings, for example, the ring 29, will project slightly from the end of the sleeve 31 as indicated at 37, Fig. 3, thereby making it possible to place the rings of the assembly under axial compression in the chamber when the wall 21 is screwed down tightly into the position in which it it shown in Fig. 1. The axial length of the sleeve 31 is made slightly less than the axial length of the chamber 22 when the wall 21 is screwed down tightly against a gasket 38 carried by the rotatable body 7. Likewise, the assembly of rings in the sleeve 31 is slightly longer than the chamber 22, when the packing unit is in its initial condition prior to its placement in the chamber 22.

The rings 28 and 28' each has an outer annular body portion 40 of a relatively hard rubber compound, and an inwardly projecting lip of a softer relatively resilient rubber compound for engagement with the outer cylindric surface of the wash pipe 19. Each annular body portion 40 is in cross-section a quadrilateral figure of a width approximately one-half the width of the spatial annulus defined by the packing chamber 22 and has an outer cylindric surface to frictionally engage the inner cylindric surface of the sleeve 31, and the body 40 is preferably reenforced with metal or other suitable substance, so that the body 40 will deform but little under axial compression. The lips 41 extend inwardly from the upper portions of the bodies 40 and have downwardly and inwardly directed relatively sharp edges 43 spaced from the bodies 40 by channels 44. These lips 41 are faced against a direction in which hydraulic fluid pressure is applied to the packing, and are each defined by conical surfaces 40a and 40b, which converge inwardly at angles $a$ and $b$ to the axis $c$—$c$ of the packing rings. The angle $a$ of the conical surface 40a is approximately 50 degrees and the angle $b$ of the conical surface 40b is approximately 16 degrees. The foregoing structural relations give lips 41 having a relatively large cross-sectional area and the inner and outer substantially conical surfaces 40a and 40b thereof are disposed to provide an effective seal when hydraulic pressure is applied to the surfaces 40a, these things contributing to long life of the packing and effective sealing of the swivel connection. The conical surface 40a is joined with the cylindric surface 40c by a surface 40d which is curved on a relatively small radius. The surface 40e of the packing rings 28 and 28' are radial and fit flat against the radial supporting surfaces provided for the lip by the end wall 23 or supporting rings 27 or 30. When the packing unit is placed in the chamber 22, the lip 41 of the upper sealing ring 28 is supported by the upper wall 24 of the chamber. The lantern ring 27 has a lower face 46 to support the lip of the uppermost sealing ring 28', and the metal supporting rings 30 support the lips of the remaining sealing rings 28'. The sealing ring 29 has also a hard, reenforced body portion 40' and a downwardly and inwardly faced resilient lip 48 for sealing engagement with the upper face of the rotatable body 7.

In the alternative form of the invention shown in the quarter-section, Fig. 4, the packing unit is moved into the packing chamber from the upper end thereof instead of from the lower end as shown in Fig. 1. In Fig. 4 I show the upper portion 50 of a rotatable swivel body 7' having therein an annular recess or chamber 22' surrounding the lower portion of a wash pipe 19'. It will be noted that the chamber 22' is open at its upper end when it is not closed by the ring fitting 51 which threads onto the upper end of the rotatable body 7' at 52. This fitting 51 has therein an annular grease chamber 52, sealed at its top end by a sealing ring 53 so that when grease is forced into the chamber 52 through the fitting 54, it cannot escape upwardly around the wash pipe 19, but may pass downward along the wash pipe into the packing unit 55 disposed in the chamber 22''.

The packing unit 55 includes a plurality of sealing rings 28 such as previously described herein, these sealing rings being separated and supported by supporting rings 30. At the lower end of the ring assembly there is a sealing ring 29 of the form previously described, and an externally threaded ring 58 is screwed into the lower end of the sleeve 31' which forms a surrounding bond and supports the ring members 28 and 30. The upper end of the sleeve 31' is connected, as by means of a weld 59 to a ring 60 having therein an opening only slightly larger in diameter than the wash pipe 19', and having an outer portion 64 forming a flange which is clamped between the upper end of the rotatable body 7' and the ring fitting 51. The inner portion of the ring 60 serves as a support for the lip of the uppermost sealing ring 28 and also provides a shoulder to support a spring 65 which holds the sealing ring 53 in the elevated position in which it is shown in Fig. 4. The packing unit 55, shown in Fig. 4, likewise can be placed in the packng chamber 22' only in upright position, for the reason that the ring 60 at the upper end thereof is of such external diameter that it cannot be moved down into the chamber 22'.

In Fig. 5 I show an alternative method of providing the bottom end of the packing unit of Fig. 3 with projections at the lower end thereof which will prevent a workman from placing it in the chamber 22 in inverted position. In Fig. 3 I have shown projecting means 33 on the sleeve 31. In Fig. 5 the functional equivalent of the projecting means 33 is in the form of a flange 33' formed on a sealing ring 29' which is similar in its general characteristics to the ring 29 of Fig. 3. This flange 33' will not pass into the chamber 22 of the member 21, but will pass into the counterbore 34 into a position above the threads 35.

I claim as my invention:

1. In packing for sealing a swivel connection comprising a packing chamber defined by an inner cylindric member and a surrounding cylindric wall in spaced relation thereto and axially spaced end walls, the first of said end walls being movable toward the second of said end walls: an assembly of ring members disposed in axial, face-to-face arrangement, and a cylindric wall holding said ring members together so that they will act as a unit, said assembly of ring members comprising a plurality of packing rings having reinforced body portions of rectangular cross-section, and resilient annular lips extending from the end portions of said body portions toward and for engagement with said inner cylindric member and against the direction of the hydraulic pressure applied to the packing, rigid supporting rings alternated with said packing rings and supportingly engaging the portions of said annular lips contiguous to their joinder with said body portions, and a sealing ring at the hydraulic pressure reciving end of said assembly making a sealing engagement with one of said end walls; said assembly of ring members being of such length relative to the minimum axial separation of said end walls that when said first end wall is moved toward said second end wall said assembly will be subjected to end pressure and the body portions of said packing rings will be placed under axial compression which will urge said lips away from said body portions and toward said inner cylindric member, one of the members of said assembly having a radially projecting portion to prevent entry of said assembly into said chamber in reversed position.

2. In packing for sealing a swivel connection comprising a packing chamber defined by an inner cylindric member and a surrounding cylindric wall in spaced relation thereto and axially spaced end walls, the first of said end walls being movable toward the second of said end walls: an assembly of ring members disposed in axial, face-to-face arrangement and being secured together to act as a unit, said assembly of ring members comprising a plurality of packing rings having reinforced body portions of rectangular cross-section, and resilient annular lips extending from the end portions of said body portions toward and for engagement with said inner cylindric member and against the direction of the hydraulic pressure applied to the packing, rigid supporting rings alternated with said packing rings and supportingly engaging the portions of said annular lips contiguous to their joinder with said body portions, and a sealing ring at the hydraulic pressure receiving end of said assembly making a sealing engagement with one of said end walls, said assembly of ring members being of such length relatively to the minimum axial separation of said end walls that when said first end wall is moved toward said second end wall said assembly will be subjected to end pressure and the body portions of said packing rings will be placed under axial compression which will urge said lips away from said body portions and toward said inner cylindric member, one of the ring members of said assembly having a radially projecting portion to prevent entry of said assembly into said chamber in reversed position.

3. In packing for sealing a swivel connection comprising a packing chamber defined by an inner cylindric member and a surrounding cylindric wall in spaced relation thereto and axially spaced end walls, the first of said end walls being movable toward the second of said end walls: an assembly of ring members disposed in axial, face-to-face arrangement, and being secured together to act as a unit, said assembly of ring members comprising a plurality of packing rings having reinforced body portions, and resilient annular lips extending from the end portions of said body portions toward and for engagement with said inner cylindric member and against the direction of the hydraulic pressure applied to the packing, rigid supporting rings alternated with said packing rings and supportingly engaging the portions of said annular lips contiguous to their joinder with said body portions, one of the ring members of said assembly having a radially projecting portion to prevent entry of said assembly into said chamber in reversed position.

4. In packing for sealing a swivel connection comprising a packing chamber defined by an inner cylindric member and a surrounding cylindric wall in spaced relation thereto and axially spaced end walls, the first of said end walls being movable toward the second of said end walls: an assembly of ring members disposed in axial, face-to-face arrangement, and being secured together to act as a unit, said assembly of ring members comprising a plurality of packing rings having reinforced body portions, and resilient annular lips extending from the end portions of said body portions toward and for engagement with said inner cylindric member and against the direction of the hydraulic pressure applied to the packing, rigid supporting rings alternated with said packing rings and supportingly engaging the portions of said annular lips contiguous to their joinder with said body portions, and a sealing ring at the hydraulic pressure receiving end of said assembly making a sealing engagement with one of said end walls, said assembly of ring members being of such length relatively to the minimum axial separation of said end walls that when said first end wall is moved toward said second end wall said assembly will be subjected to end pressure and the body portions of said packing rings will be placed under axial compression which will urge said lips away from said body portions and toward said inner cylindric member, said ring members being secured together in such manner that the external end faces of the end ring members of said assembly are exposed for engagement by said end walls of said packing chamber.

5. In packing for sealing a swivel connection comprising a packing chamber defined by an inner cylindric member and a surrounding cylindric wall in spaced relation thereto and axially spaced end walls, the first of said end walls being movable toward the second of said end walls: an assembly of ring members disposed in axial, face-to-face arrangement, said assembly of ring members comprising a plurality of packing rings each having an annular body portion of substantially quadrilateral cross-section and of a width approximately one-half the width of the spatial annulus defined by said chamber, and an annular sealing lip extending from one end of said body portion toward said inner cylindric member and faced against the direction in which hydraulic pressure is applied to the packing, said lip being defined by two conical surfaces which meet so as to define a substantially sharp edge, the conical surface proximal to said body portion being in the neighborhood of 50 degrees to the axis of said packing ring and the other of said conical surfaces being in the neighborhood of 16 degrees to the axis of the packing ring, rigid supporting rings alternated with said packing rings and supportingly engaging the portions of said annular lips contiguous to their joinder with said body portions, there being an annular wall of resilient material at the hydraulic pressure receiving end of said assembly to make sealing engagement with one of said end walls, said assembly of ring members being of such length relatively to the minimum axial separation of said end walls that when said first end wall is moved toward said second end wall said assembly will be subjected to end pressure and the body portions of said packing rings will be placed under axial compression which will urge said lips away from said body portions and toward said inner cylindric member, one of the ring members of said assembly having a radially projecting portion to prevent entry of said assembly into said chamber in reversed position.

GUGLIELMO R. TREMOLADA.

REFERENCES CITED

The following references are of record in the file of this patent:

UNITED STATES PATENTS

| Number | Name | Date |
|---|---|---|
| 2,027,653 | Ray | Jan. 14, 1936 |
| 2,049,366 | Gardner | July 28, 1936 |
| 2,052,603 | Christenson | Sept. 1, 1936 |
| 2,147,691 | Cramton | Feb. 21, 1939 |
| 2,214,261 | Roth | Sept. 10, 1940 |
| 2,364,383 | Neesen | Dec. 5, 1944 |
| 2,394,800 | Murphy | Feb. 12, 1946 |